(No Model.)

S. C. C. CURRIE.
INSULATING PLATE FOR SECONDARY BATTERIES.

No. 406,267. Patented July 2, 1889.

Witnesses
Hermann Bormann
N. Frederick

Inventor:
Stanley C. C. Currie,
by J. Walter Douglass,
Atty.

UNITED STATES PATENT OFFICE.

STANLEY CHARLES CUTHBERT CURRIE, OF PHILADELPHIA, PENNSYLVANIA, ASSIGNOR TO THE UNITED ELECTRIC IMPROVEMENT COMPANY, OF GLOUCESTER, NEW JERSEY.

INSULATING-PLATE FOR SECONDARY BATTERIES.

SPECIFICATION forming part of Letters Patent No. 406,267, dated July 2, 1889.

Application filed February 18, 1889. Serial No. 300,326. (No model.)

*To all whom it may concern:*

Be it known that I, STANLEY CHARLES CUTHBERT CURRIE, a subject of the Queen of Great Britain, but now residing at the city of Philadelphia, in the county of Philadelphia and State of Pennsylvania, have invented certain new and useful Improvements in Insulators for Electric Batteries, of which the following is a specification.

My invention relates to insulators adapted more especially to secondary or storage battery plates possessing a large proportion of active material.

The principal object of my invention is to provide improved insulators for separating the plates of storage-batteries from one another and thereby preventing contact between them, while at the same time affording free action and insulation of the fluid in the vessel that the plates are immersed in, and, moreover, permitting of the free escape of all gases and at the same time offering as little resistance as possible to the electric current.

My invention consists of a perforated corrugated insulating plate or diaphragm constructed and arranged so that there can be afforded a free circulation for the current and liquid through the perforations, as well as a free circulation of the liquid and gases in, through, or along the several grooves or recesses of the corrugated structure.

In the mounting of the plates in battery it will be understood that as much of the surface of the material as possible should be accessible to the action of the electrolyte and the surfaces of the respective positive and negative elements be as near as possible to one another, with of course space being left for the relative amount of liquid. Moreover, it is necessary that there should be a free circulation of the liquid as well as a free escape of all gases, and my invention in a marked degree possesses the capabilities of affording the fulfillment of these conditions in a most satisfactory manner.

In the accompanying drawings I have illustrated my invention in one of the forms found practically efficient, and in which—

Figure 1:
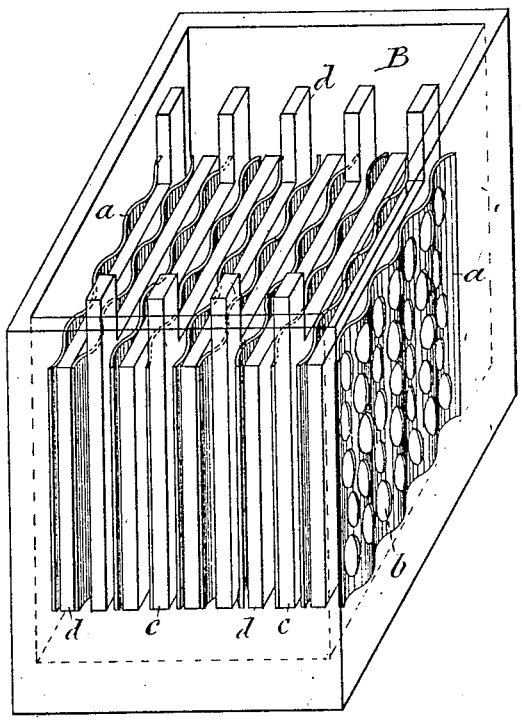
Figure 2:
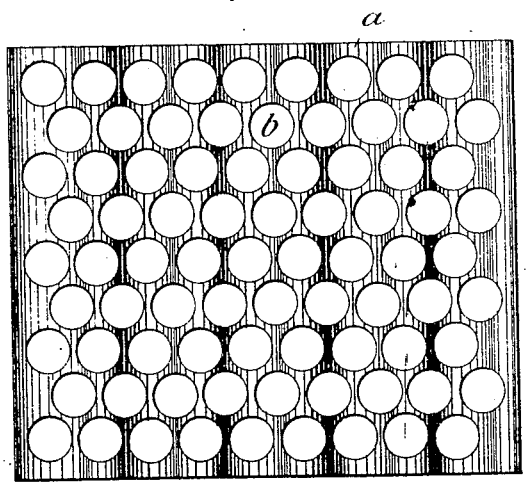
Figure 3:

Figure 1 is a perspective view of a vessel or cell containing a series of plates mounted in battery, with my improved corrugated insulating-plate shown in application between them. Fig. 2 is a side elevation of the corrugated insulating plate or diaphragm; and Fig. 3 is a top view thereof, showing the plane of corrugation of said plate or diaphragm.

Referring to the drawings for a further description of the invention, $a$ is the plate, of any desired size, made of a hard insulating material not capable of being acted upon by the electrolyte. This plate is perforated with series of holes $b$, as large and numerous as is compatible with strength. The plate is corrugated in any suitable manner, with preferably the line of corrugations thereof lying in a vertical plane. The material for the formation of the plate may be rubber or any other material, but preference is given to rubber, owing to its adaptability for the purpose, and after the perforation of the plate or diaphragm it is subjected to the action of steam or other softening agent to render it more or less pliable, when it is pressed or caused to assume in a suitable appliance a corrugated shape or form.

In Fig. 1 is illustrated a cell, vase, or vessel B, with a series of positive and negative plates $c$ and $d$, mounted therein, and a series of my improved insulating plates or diaphragms $a$ between said battery-plates, and which, with an electrolyte, constitutes a form of secondary or storage battery.

An insulating plate or diaphragm constructed and arranged substantially as hereinbefore described, for use in connection with battery-plates, presents this special feature of guarding most satisfactorily against short-circuiting as well as obviating buckling of the plates. Moreover, while performing their functions most efficiently, they can be made very economically for such uses and purposes.

Having thus described the nature and objects of my invention, what I claim as new, and desire to secure by Letters Patent, is—

1. A perforated corrugated insulating plate or diaphragm permitting of the free passage of the current as well as the free circulation of the liquid and gases 1 or through the perforations and around or along the grooves or recesses of the corrugations thereof, substantially as and for the purposes set forth.

2. A perforated corrugated insulating plate or diaphragm having the lines of corrugation lying in a vertical plane, substantially as described.

3. A perforated insulating plate or diaphragm formed with corrugations, substantially in the manner and for the purposes described.

In witness whereof I have hereunto set my signature in the presence of two subscribing witnesses.

STANLEY CHARLES CUTHBERT CURRIE.

Witnesses:
ANDREW ZANE,
THOMAS M. SMITH.